US006823131B2

(12) United States Patent
Abelard et al.

(10) Patent No.: US 6,823,131 B2
(45) Date of Patent: Nov. 23, 2004

(54) METHOD AND DEVICE FOR DECODING A DIGITAL VIDEO STREAM IN A DIGITAL VIDEO SYSTEM USING DUMMY HEADER INSERTION

(75) Inventors: Franck Abelard, Chateaubourg (FR); Philippe Leyendecker, Chateaugiron (FR)

(73) Assignee: Thomson Licensing S.A., Boulogne-Billancourt (FR)

(*) Notice: Subject to any disclaimer, the term of this patent is extended or adjusted under 35 U.S.C. 154(b) by 287 days.

(21) Appl. No.: 09/824,267

(22) Filed: Apr. 2, 2001

(65) Prior Publication Data

US 2001/0040925 A1 Nov. 15, 2001

(30) Foreign Application Priority Data

Apr. 5, 2000 (EP) .............................................. 00400941

(51) Int. Cl.⁷ ................................................. H04N 5/91
(52) U.S. Cl. ......................... 386/68; 725/153; 386/124
(58) Field of Search ....................... 348/423.1; 370/537, 370/535; 375/240.01, 240.12, 240.14, 240.23, 240.26–240.28; 386/46, 68, 81, 109, 111, 124, 131; 725/89, 90, 153; H04N 7/12, 5/91

(56) References Cited

U.S. PATENT DOCUMENTS

| | | | | |
|---|---|---|---|---|
| 5,648,960 A | * | 7/1997 | Sakazaki et al. ............... 386/46 |
| 5,740,307 A | * | 4/1998 | Lane .......................... 386/111 |
| 5,793,927 A | * | 8/1998 | Lane ........................ 348/423.1 |
| 5,832,085 A | * | 11/1998 | Inoue et al. ................. 386/124 |
| 6,031,960 A | * | 2/2000 | Lane ...................... 375/240.26 |
| 6,219,381 B1 | * | 4/2001 | Sawada et al. ......... 375/240.14 |
| 6,333,950 B1 | * | 12/2001 | Karasawa .............. 375/240.23 |
| 6,404,818 B1 | * | 6/2002 | Obikane ................ 375/240.28 |
| 6,466,732 B1 | * | 10/2002 | Kimura et al. ............. 386/111 |
| 6,480,664 B1 | * | 11/2002 | Ting et al. ................... 386/111 |
| 6,504,855 B1 | * | 1/2003 | Matsunaga ................... 370/537 |
| 6,510,554 B1 | | 1/2003 | Gordon et al. ................ 725/90 |
| 2002/0067744 A1 | * | 6/2002 | Fujii et al. .................... 370/535 |

FOREIGN PATENT DOCUMENTS

| | | | | |
|---|---|---|---|---|
| EP | 0711083 A3 | 5/1996 | ............ H04N/9/80 |
| EP | 0748129 A2 | 12/1996 | .......... H04N/9/804 |
| WO | WO 98/32284 | 7/1998 | ............ H04N/7/24 |

* cited by examiner

Primary Examiner—Vincent Boccio
(74) Attorney, Agent, or Firm—Joseph S. Tripoli; Ronald H. Kurdyla; Guy H. Eriksen

(57) ABSTRACT

A method and device for decoding a packetized data stream comprising packets is disclosed. Each packet comprises a header and a payload encapsulating an elementary stream. The method includes selecting an object header in the elementary stream, inserting a packetized data stream packet header before the object header and transferring the inserted packet header, the object header, and data of the packetized data stream consecutive to the object header to a packetized data stream parser. This is applicable to digital video systems and in particular to digital television decoders.

12 Claims, 6 Drawing Sheets

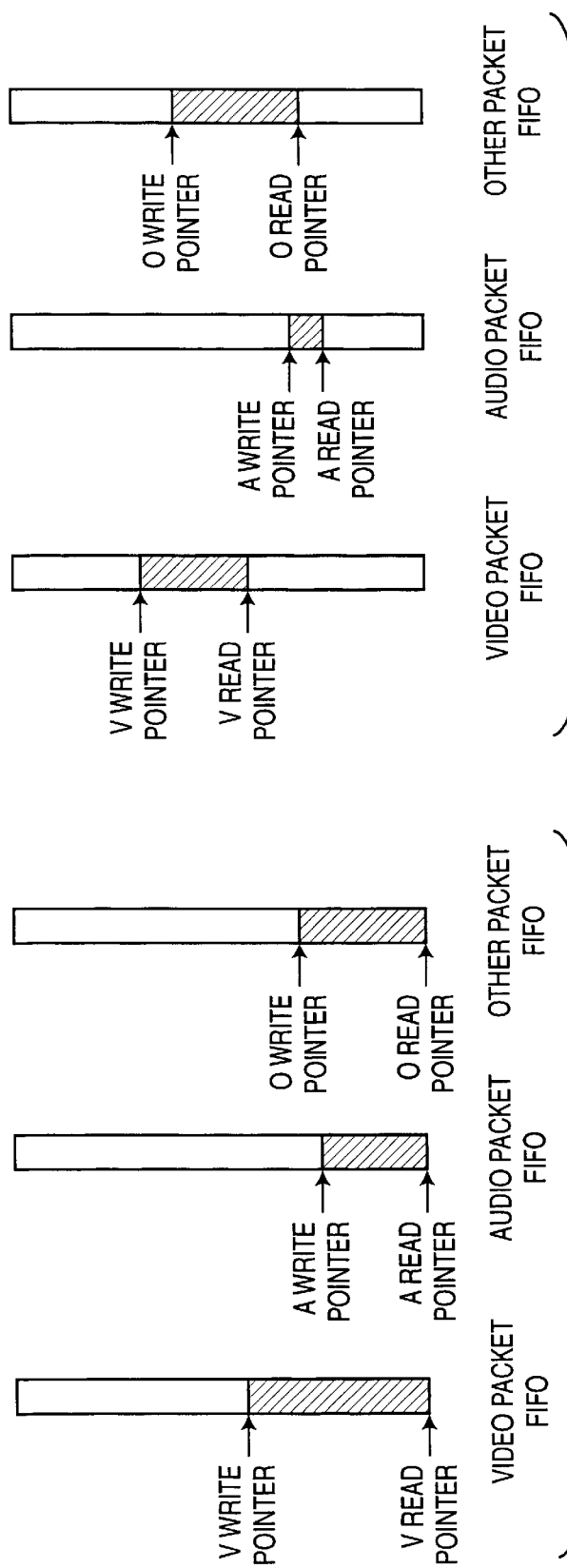

METHOD AND DEVICE FOR DECODING A DIGITAL VIDEO STREAM IN A DIGITAL VIDEO SYSTEM USING DUMMY HEADER INSERTION

FIELD OF THE INVENTION

The invention concerns a method for decoding recorded transport streams or packetized elementary streams in a digital video system. It also concerns a device implementing this method. The invention may in particular be applied to trickmode decoding.

BACKGROUND OF THE INVENTION

An MPEG II or DVB compliant digital television stream comprises several layers, among which the elementary stream layer, the Packetized Elementary Stream (PES) layer and the Transport Stream (TS) layer. A corresponding decoder usually comprises a demultiplexer for filtering certain TS layer packets, a PES Parser for removing the PES layer and transferring the original elementary streams and at least a video decoder for decoding the video elementary stream.

Future decoders will incorporate mass storage devices in order to record compressed TS or PES streams. In order to implement trickmodes, such as slow or fast forward or backward play, the video stream needs to be edited before being transferred from the mass storage device to the video decoder. In particular for fast forward or backward play, only specific pictures or picture sequences are to be displayed. Due to the editing, the resulting data transferred to the video decoder will not necessarily have a valid TS or PES stream format, and the behavior of the video decoder may not necessarily be what is expected.

The goal of the invention is to send only legal (in the sense of the ISO 13818-2 standard) streams to the video decoder.

SUMMARY OF THE INVENTION

One object of the invention is a method for decoding a packetized data stream comprising packets, a packet comprising a header and a payload, an elementary stream being encapsulated as payload in the packets, characterized in that it comprises the steps of:

selecting an object header in the elementary stream;

inserting a packetized data stream packet header before said object header;

transferring the inserted packet header, the object header and data of the packetized data stream consecutive to the object header to a packetized data stream parser.

By inserting an additional packet header before the header of the object to be parsed and decoded, the integrity of the elementary stream, as seen from the parser, is restored. Thus the parser will behave correctly.

According to a particular embodiment, the packetized data stream is a PES stream, the elementary stream an elementary video stream and the object header one of the following: a sequence header, a picture header, a group of picture header.

Another object of the invention is a method for decoding a transport stream encapsulating a packetized data stream comprising packets, a packet comprising a header and a payload, an elementary stream being encapsulated as payload in the packets, characterized in that it comprises the steps of:

selecting an object header in the elementary stream;

inserting a transport stream packet before the transport stream packet containing the object header, said inserted transport stream packet comprising a packetized data stream header;

transferring the inserted transport stream packet followed by the transport stream packet containing the object header to a transport stream demultiplexer followed by a packetized data stream parser.

Constraints applying to TS streams are different from those applying to PES streams, as far as stream edition is concerned. In order to insert a PES packet header, a special TS packet has to be inserted, with the PES packet header contained as the TS packet's payload.

According to a particular embodiment, the transport stream, the packetized data stream and the elementary stream are MPEG compliant, wherein the elementary stream is an elementary video stream, and wherein the object header is one of the following: a sequence header, a picture header, a group of picture header.

Another object of the invention is a digital video decoding device characterized in that it comprises:

a mass storage device for storing a digital video stream having packetized elementary stream format;

a video decoding circuit adapted to receive packetized elementary stream format data;

a circuit for locating an object header in an elementary video stream encapsulated in said digital video stream, for transferring to the decoder a part of the elementary stream starting from said object header and for inserting a dummy packetized elementary stream packet header in front of said object header before said transfer.

Another object of the invention is a digital video decoding device characterized in that it comprises:

a mass storage device storing a digital video stream having transport stream format;

a video decoding circuit adapted to receive transport stream format data;

a circuit for locating an object header in an elementary video stream encapsulated in said digital video stream, for transferring, to the decoder, the transport stream starting at the transport stream packet containing the elementary stream packet containing the object header and for inserting a transport stream packet before the transport stream packet containing the object header, said inserted transport stream packet comprising a packetized data stream header.

BRIEF DESCRIPTION OF THE DRAWINGS

Other characteristics and advantages of the invention will appear through the description of particular non-limiting embodiments of the invention, illustrated by the drawings among which:

FIG. 4a is a diagram of an elementary storage unit ('SEU') used to store stream data, in PES mode, while FIGS. 5a and 5b are diagrams of the FIFOs used to store PES data to be written to the hard disk drive when in PES mode.

DETAILED DESCRIPTION

The present description is made in the frame of a system accepting an MPEG II compliant data stream and uses the corresponding vocabulary. More information concerning the MPEG II standard syntax for video and transport level coding can be found for instance in the documents: ISO/IEC 13818-1 (Information Technology—Generic coding of moving pictures and associated audio information: Systems) and ISO/IEC 13818-2 (Information Technology—Generic coding of moving pictures and associated audio information: Video). The present system also complies with the DVB ETR-154 standard.

The invention is of course not limited to the MPEG II environment, or to the data layers described in the present patent application.

1. System Overview

To achieve high quality trickmode management when playing back a video stream from a local mass storage device, the knowledge of the structure of the recorded video stream is required. This structure will be called trickmode information in what follows. It results from a parsing process carried out before and during the recording of the video stream. Parsing consists in analyzing the stream structure and in memorizing the nature of certain syntactical structures. Information relating to the structures, as well as their position on the mass storage medium, are also recorded.

According to the present embodiment, data such as but not limited to video is recorded at the transport stream layer or the packetized elementary stream layer. Trickmode information describes the structure of the stored video stream at a number of layers (Transport Stream (TS)—Packetized Elementary Stream (PES)—Elementary Stream (ES) according to the well-known MPEG II syntax), down to the compressed video information.

The main embodiment, carrying out recording at the TS layer level, will be described first. Differences with the second embodiment, which records at the PES layer level, will be indicated in each case. Both embodiments being compatible in the sense that both recording levels can cohabit in a same decoder, they will both be described in reference to FIG. 1.

(a) TS Layer Recording

Figure 1:
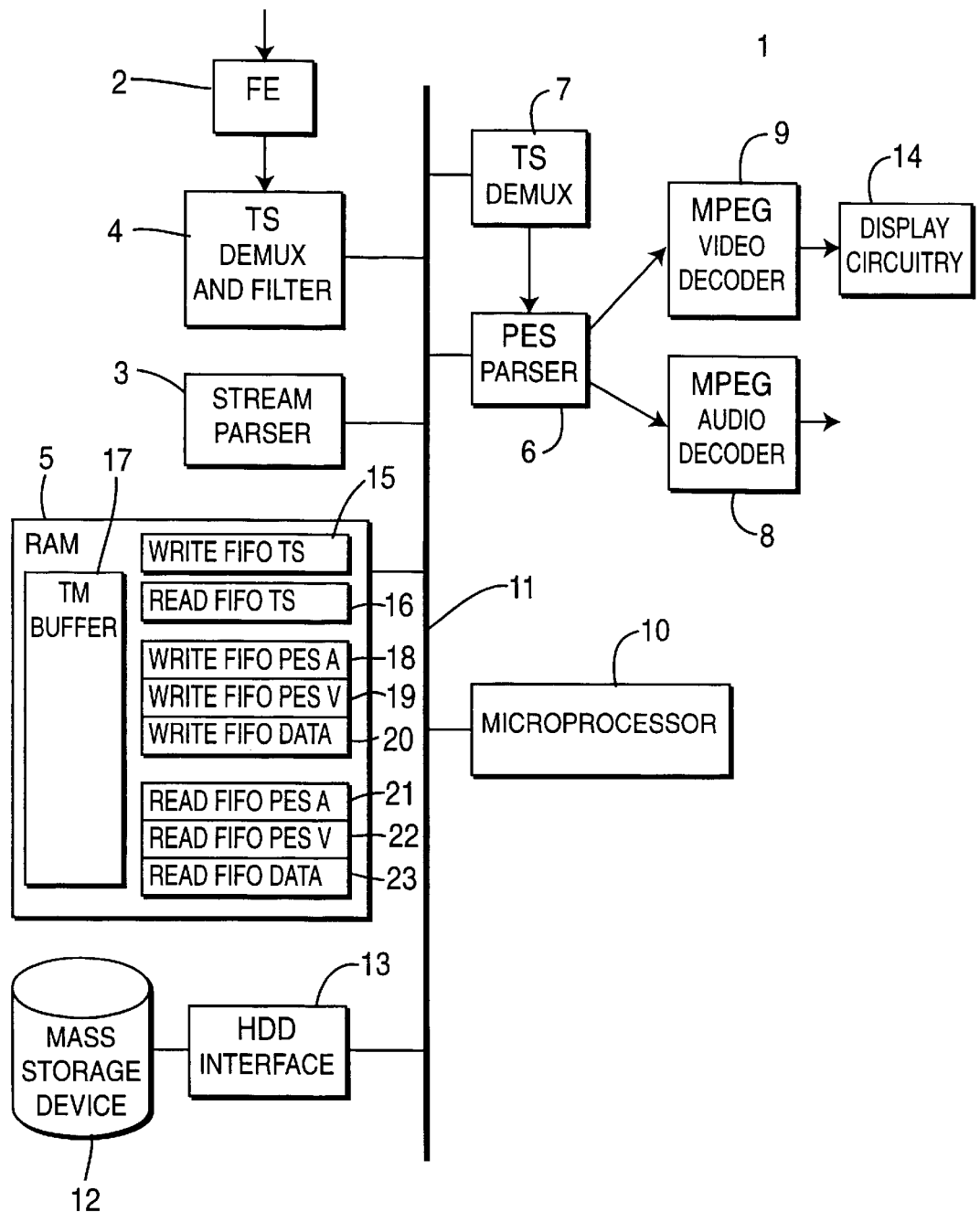
FIG. 1 is a block diagram of a television receiver according to the present embodiment.

FIG. 1 is a block diagram of a digital television receiver according to the present embodiment. The receiver 1 comprises front-end circuitry 2 which can output a transport stream to a transport stream demultiplexer and filter 4. The front-end circuitry typically includes a tuner, an analog/digital converter, an appropriate demodulator and forward error correction circuits. It receives a signal from a signal source (not shown), which is typically a cable, a satellite dish and associated low-noise block and down-converter, or a terrestrial antenna. Global resources in the system comprise a RAM 5, a PES Parser 6, a second Transport Stream demultiplexer 7, audio and video decoders 8 and 9 and a microprocessor 10. The TS filter and demultiplexer 4 is programmed by the microprocessor to filter and extract from incoming transport stream data packets corresponding to certain criteria, typically data packets having certain Packet Identifier (PID) values. Incoming stream content, in particular PID assignment, is known for example from a certain number of transmitted data tables defined by the MPEG II standard or the DVB Service Information standard (Document reference ETSI EN 300 468). Private PID values may also be defined.

Filtered transport stream data packets are buffered in memory 5, a part of which is arranged as a TS Write FIFO 15, for further processing by Stream Parser 3.

Contrary to a conventional demultiplexer, which dispatches the different TS packets to separate buffers according to their PID value and thus their destination application (e.g. the audio and video decoders), the TS filter and demultiplexer 4 writes all packets corresponding to PIDs of streams to be recorded to a single buffer (i.e. TS Write FIFO 15 in the present embodiment), in the order of packet reception.

Compressed stream data and other data (e.g. control data) are transmitted between peripheral blocks through data paths modelised by the bus 11. The receiver further comprises a mass storage device 12, which according to the present embodiment is a hard disk drive. Mass storage device 12 is connected to bus 10 through an interface 13, in the present case an EIDE interface. The video decoder circuit 9 is connected in a known fashion to video processing and display circuitry 14.

Memory 5 contains the following areas:
the already mentioned write FIFO 15 for storing filtered TS packet data to be written to the hard disk,
a TS read FIFO 16 for storing TS packets data read from the hard disk,
a trickmode buffer area 17 to store trickmode information to be written to, (or read from,) the hard disk.

(b) PES Layer Recording

For the purpose of PES layer recording, the memory 5 contains three write FIFOs referenced 18 to 20, respectively dedicated to Audio PES, Video PES and other data, and three read FIFOs referenced 21 to 23, also respectively dedicated to similar types of packets.

When the decoder functions in PES mode, the second demultiplexer 7 is not used, the PES packets being transferred directly from the hard disk 12 to the PES parser 6 through FIFOs 21 and 22.

The FIFOs 15, 16 and 18 to 23 are preferably organized in a circular manner.

2. Mass Storage Device

Figure 2:
FIG. 2 is a diagram of the file system of a hard disk drive used as a mass storage medium according to the present embodiment.

The hard disk drive file system will now be described. The disk drive 12 possesses a file system shown by the diagram of FIG. 2, the file system being dedicated to audio/video stream recording and reproduction. The file system responds to the specific requirements of the type of data which it manages. The present file system is optimized for sequential access of isochronous data streams, with blocks of relatively large size.

As a variant, a second file system (not illustrated) dedicated to the recording and retrieval of other data than streamed data may be present on the same hard disk. This second file system is optimized for random access to more conventional computer-type files. The boot block can be common to both file systems. This second file system is of a conventional type, such as a UNIX or MINIX file system, and will not be described in more detail.

Figure 3:
FIG. 3 is a diagram of the part of the file system dedicated to the recording and reproduction of audio/video streams.

FIG. 3 is a more detailed look at the stream file system. This file system comprises a superblock, a node storage area, a run extension storage area, an audio/video data storage area and a bit table area, which holds three bit tables describing the state of each elementary storage structure in each of the three storage areas.

The boot block comprises general information concerning the hard disk drive, such as volume name and volume identifier, BIOS parameters and a boot program.

The superblock contains information concerning the stream file system, in particular the addresses (under the form of logical block addresses—'LBAs') and sizes of the different areas of the file system.

The node storage area is used to store nodes. A node is a data structure describing a file stored in the audio/video data storage area. It may also describe a directory. It contains such information as the file name, parent directory information and a description of the parts of the audio/video data storage area where the file is located. This information is given under the form of LBA runs, defined by an LBA starting address and a number of LBA blocks forming the run. Since a limited number of runs may be stored in a given node, a pointer within the node may point to a run extension data structure located in the corresponding storage area. File location information is replaced by file or directory identifiers if the node is used to describe a directory. The first node describes the root directory.

The run extension storage area contains particular data structures identifying further LBA runs for a given file.

The bit table area contains three bit tables: the node bit table, the run extension bit table and the Storage Elementary Unit bit table. The first two tables respectively indicate the free or used state of each node, respectively run extension. The third table does the same for each elementary storage unit, which according to the present embodiment, represents a block of 128 Kbytes (of course, blocks of a different size and especially of larger size may be used, the 128 K value being given only as an example).

Finally, the audio/video data storage area comprises a series of elementary storage units ('SEU'). Each SEU comprises 256 sectors, thus representing 128 Kbytes.

Using the above data structures, the microprocessor 10 can create and delete files as well as write data to and read data from these files.

(a) For TS Layer Recording

Figure 4A:
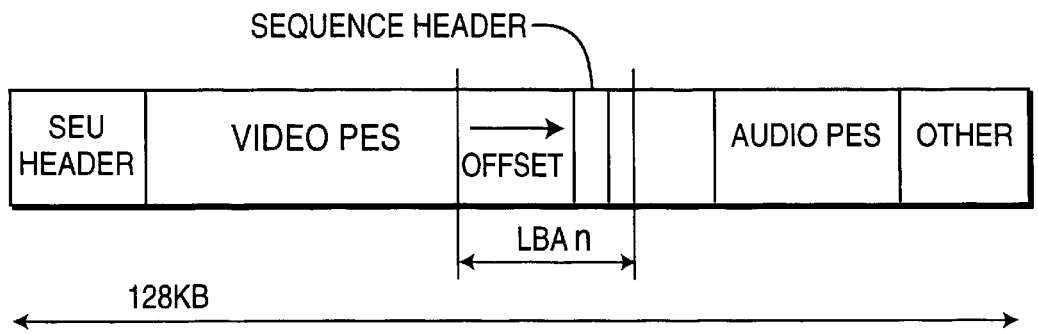
Figure 4B:
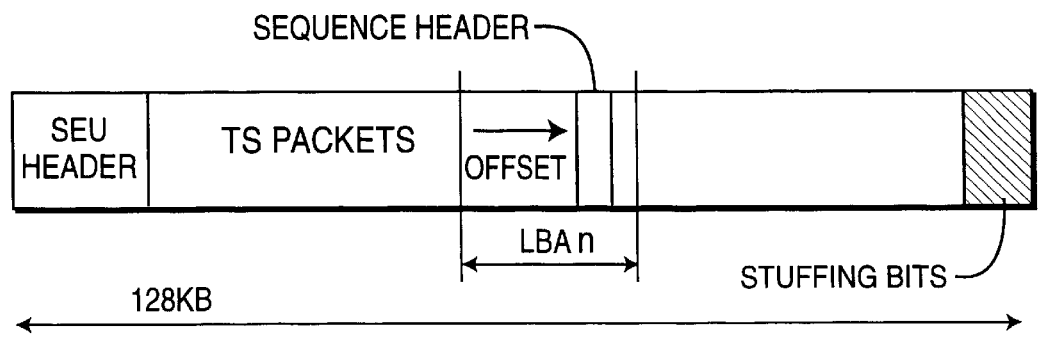
FIG. 4b is a diagram of a SEU used to store stream data in Transport Stream mode.

FIG. 4b is a diagram of a SEU when it is used for TS layer recording.

The SEU comprises a short header and a payload made of a number of multiplexed whole TS packets. Since the SEU size is a multiple of 512 bytes since it contains an integer number of TS packets, a certain number of stuffing bits have to be added to the payload.

(b) For PES Layerrecording:

FIG. 4a illustrates the contents of a PES stream SEU. The SEU comprises a header and, according to the present embodiment, up to three areas of varying size, respectively dedicated to video PES packets, audio PES packets and other PES packets.

The number of areas is not limited to three, although this is a realistic example. Several video elementary streams, audio elementary streams and auxiliary data streams may lead to a corresponding number of areas within a SEU. In this case, the memory 5 will contain a corresponding number of read/write FIFOs.

3. Recording Process (a) TS Layer Recording

The constitution of a SEU for TS layer recording and reproduction can best be explained by describing how filtered TS packets are handled by the different elements of the receiver. Once the demultiplexer has selected the packets corresponding to the programmed PID values, it stores them in the circular write FIFO 15 in memory 5. The type of content of a packet, i.e. video (V), audio (A) or other (O), is determined by the microprocessor 10 from the respective PID values in the packet headers. The content of video (V) transport stream packets processed by the demultiplexer is parsed, i.e. analyzed by the Stream Parser 6, for extraction of certain types of trickmode information described in more detail later. In principle, no such analysis is performed for audio or other data packets. The initial order of the TS packets in the stream is maintained in the FIFO 15. This way, the continuity counter values in the different packets remain coherent. Moreover, the synchronization between the different streams (in particular the video and audio streams corresponding to a same event) is maintained. Microprocessor 10 manages a read and a write pointer for the write FIFO 15, as illustrated by FIG. 5a. When the difference between the write and read pointers reaches the equivalent of 128 Kbytes minus the size of a SEU header, the microprocessor launches a write process to the hard disk.

For TS recording, each SEU header contains an indication of the length of useful data in the TS packet payload, in order to distinguish between TS packets and stuffing bits.

(b) PES Layer Recording:

In this case, the demultiplexer and filter 4 does not only filter TS packets: it also strips the TS layer away, before writing the TS payload, i.e. the PES packets, into RAM 5. PES packets are transferred to one of the circular write FIFOs 18 to 20 depending on the value of the PID of the TS packet in which they were transported. Microprocessor 10 manages read and write pointers for each of these FIFOs. When the sum of all the differences between the write and read pointers for all buffers reaches the equivalent of 128 Kbytes minus the size of a SEU header, the microprocessor launches a write process to the hard disk. Video PES are parsed by Stream Parser 3 for trick mode information.

For PES recording, the header contains an information of the quantity of data of each type which is going to be written to the SEU, i.e. the size of each area associated with a specific PID, and the offset address of each area within the SEU. No stuffing bits are used in case of PES recording: PES packets may begin in one SEU and end in the following SEU.

The write process, be it for TS or PES recording, is started by the microprocessor 10, by sending an appropriate command to the EIDE interface, specifying the LBA address where the writing should start and the number of LBAs to be written. Once the hard disk drive is ready to carry out the writing process, the EIDE interface informs the microprocessor by an appropriate interrupt.

The write process continues by writing the SEU header content, generated by the microprocessor 10, to the HDD interface. The write process further continues by initiating DMA processes to the HDD interface 13 either from TS Write FIFO 15 (for TS recording) or in turn for each of the write FIFOs 18 to 20 (for PES recording). In a known fashion, HDD interface 13 comprises a cache memory acting as buffer for disk accesses.

It is of course supposed here that the proper file has been opened by the microprocessor and that the microprocessor has also indicated the destination SEU for the transferred data to the EIDE interface.

While this hard disk write process is taking place, packets (whether TS or PES) continue to be written to the FIFOs.

For PES recording, if FIG. 5a illustrates the FIFO and read and write pointer states just before transfer to the disk begins, then FIG. 5b represents the state once the transfer is achieved. When the pointers reach the top addresses of the FIFOs, they wrap around to the bottom addresses. Although the FIFOs all have the same apparent size in FIGS. 5a and 5b, different sizes may be used. A similar process applies for TS recording.

4. Trickmode Data Generation

Figure 6:
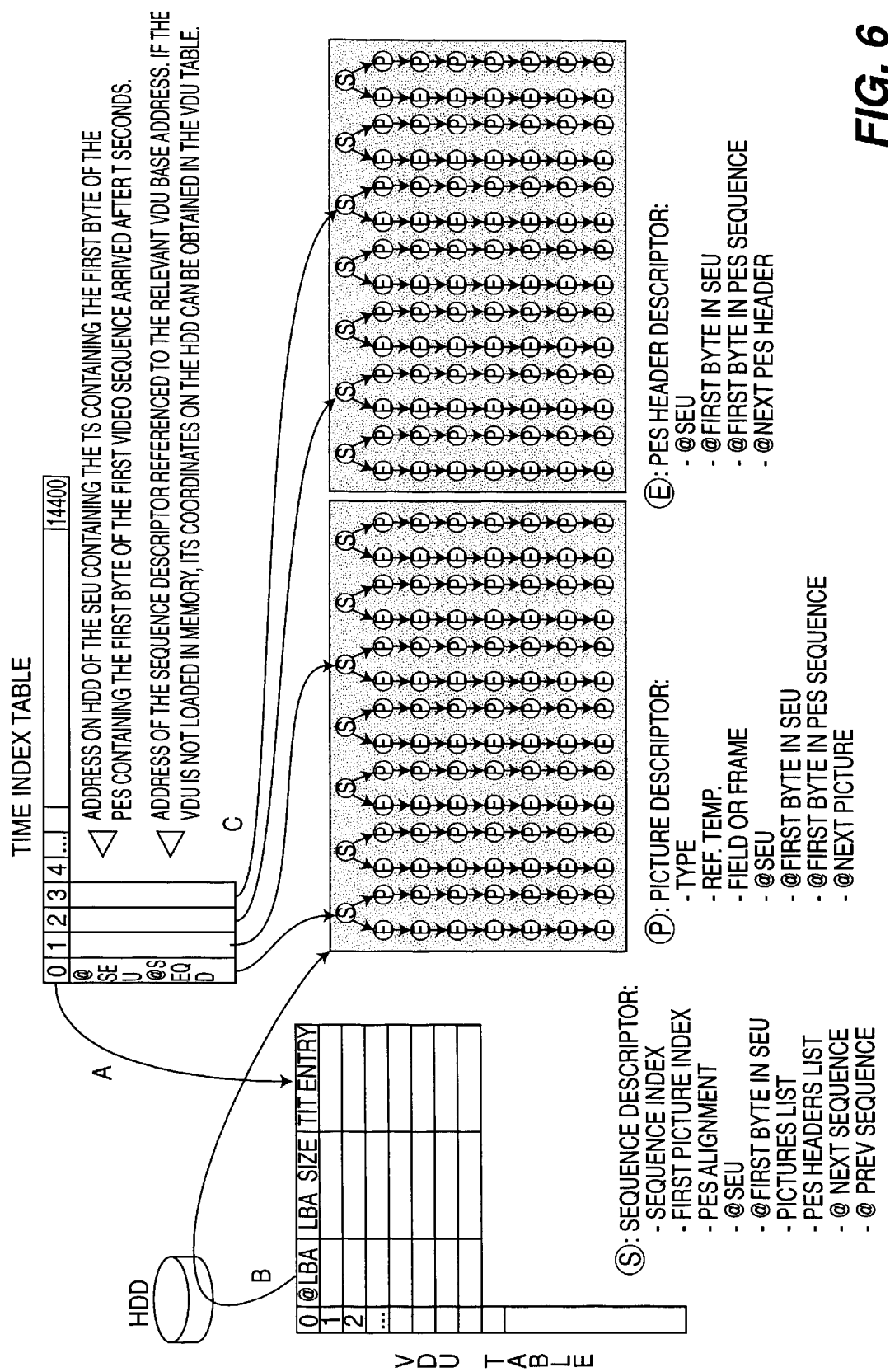
FIG. 6 is a diagram representing different data structures for storing trickmode information according to the present embodiment.

FIG. 6 is a diagram of the data structures used to store trickmode information. These structures and their storage will be discussed first, followed by the method for obtaining the corresponding data during stream recording.

According to the present embodiment, trickmode data is spread over three different structures: a Video Description Unit Table (VDU Table), a Temporal Indexing Table (TT) and a number of descriptor blocks (Video Description Units—VDUs).

FIG. 6 shows two VDUs, appearing in gray. A VDU contains descriptors of a number of sequences, and for each sequence, descriptors relating to the PES Headers and the Pictures comprised in that sequence. As an example, according to the present embodiment, each VDU contains seven sequence descriptors, corresponding approximately to 3.5 seconds of video. VDUs may also simply have a maximum size and describe a variable number of sequences.

The tables and explanations given below refer to the PES layer recording mode. For TS layer recording, an address of an item on the disk or in a SEU is to be replaced by the address of the TS packet header of the TS packet containing the first byte of the item.

Each sequence descriptor ("S" descriptor) comprises the data shown in table 1:

TABLE 1

Sequence descriptor

Sequence Index
First Picture Index
PES Alignment
SEU Address
First Byte Address in SEU
Picture List
PES Header List
Next Sequence Address
Previous Sequence Address According to the present embodiment, a 'sequence' is an MPEG II sequence as defined in the ISO/IEC 13818-1 document.

The sequence index gives the rank of a sequence, compared to the beginning of the recorded video stream.

The First Picture Index gives the rank of the first picture within the sequence, compared to the beginning of the video stream.

The PES Alignment is a flag indicating whether PES headers in the sequence are immediately followed by a picture header or not.

The SEU (Storage Elementary Unit) Address is the address (Logical Block Address number), on the hard disk, of the 128 Kb block containing the first byte of the sequence header.

The Address of the First Byte in the SEU is the offset in bytes, compared to the beginning of the SEU, of the first byte of the sequence header.

The Picture List is a list of pointers, in the VDU, to the Picture descriptor of each picture in the considered sequence.

All pointers in the VDUs use a relative addressing scheme based on the VDU base address. This way, the VDU can be loaded into any memory area while retaining valid pointer values.

In a similar fashion, the PES Header List is a list of pointers, in the VDU, to the PES Header descriptor of each PES Header in the considered sequence.

The Next Sequence Address is a pointer, in the VDU, to the address of the Sequence descriptor corresponding to the video sequence following the considered sequence. A specific address value is used to indicate the case where this descriptor is in another VDU.

In a similar fashion, the Previous Sequence Address is a pointer, in the VDU, to the address of the Sequence descriptor corresponding to the video sequence preceding the considered sequence. A specific address value is used to indicate the case where this descriptor is in another VDU.

Each Picture descriptor ("P" descriptor) holds the following data items:

TABLE 2

Picture descriptor

Type
Time Reference
Field/Frame
SEU Address
First Byte Address in SEU
Address of First Byte in PES Sequence
Next Picture Address The Type information indicates whether the picture is of the Intra, Predictive or Bi-directional coding type.

The Time Reference information is directly extracted from the MPEG II picture header. It gives the display order of the pictures relative to each other.

The Field/Frame information indicates whether the picture comprises an even field, an odd field or a whole frame.

The SEU Address is the number of the first LBA of the SEU containing the picture header's first byte.

The First Byte Address in SEU is the offset in bytes, compared to the beginning of the SEU Address, of the first byte of the Picture header. It allows a direct access to the first byte of the picture. This information is derived by the Stream Parser.

The Address of First Byte in PES Sequence is the relative address between the first byte of the picture start code and the first byte of the whole video sequence that will be loaded into the memory for the edition during the restitution.

The PES Header's contents may be required to properly decode and/or present the picture. Consequently, descriptors are also created for PES Headers.

Each PES descriptor ("E" descriptor) holds the following data items:

TABLE 3

PES descriptor

SEU Address
Address of the first byte in SEU
Address of the first byte in PES Sequence
Address of next PES Header The SEU Address is the number of the first LBA of the 128 Kb block containing the PES Header's first byte.

The First Byte Address in SEU is the offset in bytes, compared to the beginning of the SEU Address, of the first byte of the PES header.

The Address of First Byte in PES Video Sequence is the offset, in bytes, of the start of the PES start code compared to the first byte of the whole video sequence that will be loaded into memory during restitution.

The Address of next PES Header is the pointer to the next PES Header in the VDU.

Although this is not the case in the present embodiment, according to a variant embodiment, another descriptor is associated with Group of Picture (GOP) headers.

The Temporal Index Table has the format shown by table 4.

TABLE 4

Temporal Table

| Temporal Index | Sequence Descriptor Address | SEU Address |
|---|---|---|
| 0 | xxx | yyy |
| 1 | xxx | yyy |
| 2 | xxx | yyy |
| 3 | xxx | yyy |
| ... | ... | ... |
| 14400 | xxx | yyy |

The temporal index corresponds to the number of seconds, counted from the beginning of a video stream. According to the present embodiment, 14400 entries are possible, corresponding to four hours of video, with one picture or frame representing 40 ms.

The Sequence Descriptor Address gives the pointer to the Sequence descriptor containing the first picture after the temporal index, compared to the corresponding VDU base address. If the corresponding VDU is not present in memory, it has to be loaded from the hard disk first, using information given in the VDU Table.

The SEU Address is the address, in LBA number on the hard disk drive, of the SEU containing (a) in case of TS layer recording, the transport packet header of the transport stream packet containing the Sequence header of the first video sequence starting after T seconds, (b) in case of PES layer recording, the sequence header of the first video sequence starting after T seconds.

For access to a video sequence starting approximately at a time T in seconds, it suffices to address the Temporal Table using T as an index and to use the corresponding SEU Address to start reading from the disk starting at the LBA which contains the beginning of the Transport Stream packet required to decode the sequence (in case (a)) or directly the sequence header location (in case (b)). Only the Temporal Table is required for such an access.

The rest of the data stored in both tables and VDUs is mainly used for Trickmode reproduction.

The VDU Table has the format shown by table 5:

TABLE 5

VDU Table

| VDU Index | LBA Address | Size in LBAs | Temporal Table Index |
|---|---|---|---|
| 0 | Xxx | yyy | Zzz |
| 1 | Xxx | yyy | Zzz |
| 2 | Xxx | yyy | Zzz |
| ... | ... | ... | ... |

The VDU Table has an entry for each VDU, and indicates for each VDU the number of the first LBA on the hard disk, the size of the VDU in terms of LBAs and the time interval (in seconds, starting from the beginning of the video stream) of the portion of video represented by the VDU. This interval specifies the entries into the TT Table.

The Temporal Index Table, the VDU Table and the VDUs are stored on the hard disk. The tables are also loaded into the trickmode buffer area 17 of memory 5, for modification in case of recording of video to the hard disk and for reference in case of reproduction from the hard disk. The necessary VDUs are read/written from/to the hard disk as required, depending also on the available quantity of free memory.

Generation of the trickmode data stored in the TIT and VDU Tables and in the VDUs is carried out as follows.

The information to be generated is of three kinds: information extracted directly from the demultiplexed video packets, information describing the structure of the video stream and information relating to the location of certain video stream data on the hard disk drive. In the first case, a simple parsing of the PES or Picture headers in the stream yields the required information. In the second case, the video stream has to be analyzed and its structure memorized. In the third case, further information has to be sought from the file system. Table 6 indicates the origin of each kind of data.

TABLE 6

| Descriptor | Data | Origin |
|---|---|---|
| S | Sequence Index | Video stream analysis |
| S | First Picture Index | Video stream analysis |
| S | PES Alignment | PES Header |
| S | SEU Address | File System & Write FIFO management |
| S | First Byte Address in SEU | File System & Write FIFO management |
| S | Picture List | Video Stream analysis |
| S | PES Header List | Video Stream analysis |
| S | Next Sequence Address | Video Stream analysis |
| S | Previous Sequence Address | Video Stream analysis |
| P | Type | Picture Header |
| P | Time Reference | Picture Header |
| P | Field/Frame | Picture Header |
| P | SEU Address | File System & Write FIFO management |
| P | First Byte Address in SEU | File System & Write FIFO management |
| P | Address of First Byte in PES Sequence | Video stream analysis |
| P | Next Picture Address | Video Stream analysis |
| E | SEU Address | File System & Write FIFO management |
| E | Address of the first byte in SEU | File System & Write FIFO management |
| E | Address of the first byte in PES Sequence | File System & Write FIFO management |
| E | Address of next PES Header | Video Stream analysis |

It is supposed in what follows that only one elementary video stream is recorded at a given time, i.e. only one Video PID is filtered. If more than one Video PID is filtered, the tables and VDUs are created in parallel and separately for each stream.

Parsing is carried out in a similar manner for TS and PES layer recording, i.e. the same items are spotted in the stored data. What changes is that for TS recording, when an item is spotted, the address of the TS header of the TS packet containing this item is used instead of the item's address.

The TS or PES packets stored by the demultiplexer in memory 8 are analyzed by first detecting Sequence headers, PES headers or Picture headers. Each of these headers has a predefined start code, defined by the MPEG II Video standard, and can easily be spotted in the incoming TS packet payloads or PES packets. Care has to be taken not to miss picture or sequence start codes spread over two PES packets, and picture, sequence or PES header start codes spread over two TS packets. For each detected header, a corresponding descriptor (S, P, E) is created. PES and Picture headers are further parsed to extract the relevant fields to be inserted into the descriptors. Sequences and pictures are numbered starting from the first sequence, respectively picture, and the sequence numbers and first picture numbers in each sequence are inserted into the sequence descriptors. As already mentioned, a new VDU is created approximately for every 3.5 seconds of video, in order to maintain VDU size manageable. Such a VDU holds an average of 84 pictures. A VDU holds only complete sequences, so the size of a particular VDU may vary.

Microprocessor 10 also determines the next SEU block address to which audio, video and/or other data is to be written. During the parsing process, the Stream Parser 6 determines the offset in bytes (or LBAs and bytes) of a given piece of data, compared to the beginning of the SEU. The offset is reset each time a SEU is written to the disk. Offsets are determined for the following data items: for PES layer recording, Sequence headers, Picture headers, PES headers, and for TS layer recording, the addresses of the corresponding TS packet headers. SEU address and offsets for the three headers are inserted into the respective descriptors.

In parallel to the creation of the VDUs, the microprocessor creates the VDU Table and the Temporal Table.

An entry into the VDU Table is created every time a VDU is ready to be written to the disk. (According to the present embodiment, VDUs are written to a file of the stream file system. For each VDU, its position and size is given, in LBAs. The time interval it covers (in seconds, compared to the beginning of the video stream) is calculated, based on the number of pictures contained in the VDU. This information is also inserted into the VDU Table.

The Temporal Index Table comprises one entry per second according to the present embodiment. Its content is determined using the content of the VDUs and the TS header offsets (for TS layer recording) or the Sequence Header offsets (for PES layer recording).

Both the VDU Table and the Temporal Index Table are written to the hard disk once they are created. Depending on their size and on the available memory, it may be required to split these tables and to load partial tables as required.

VDUs are intentionally made of linked elements using relative addressing to allow splitting and dynamic relocation in memory.

5. Trickmode Restitution

During trickmode video restitution, audio data is not transmitted to the audio decoder.

Reproduction from the hard disk drive for trickmode purposes will now be described. During this phase, the microprocessor 10, performs real-time stream edition of the previously recorded video stream, extraction and reordering of video access units (a unit being coded data relating to one picture) based on trickmode information, feeding of the decoder 9 and control of the decoding and display processes.

As the random access time to the hard disk drive is quite long, a realistic method is to read a slice of the recorded stream containing a single video sequence from the disk into the memory 5. The whole sequence being in memory 5, each picture in the sequence can be accessed to be transferred to the video decoder.

The PES parser 6 and/or the TS demultiplexer 7 remove the corresponding PES or TS layers, and extract information relevant to the lower layers from the PES headers, respectively TS headers. When receiving data, whether directly from the bus or from the demultiplexer 7, the PES parser will reject any data appearing before a valid PES header start code.

For trickmode reproduction, pictures in the stream are accessed one by one in memory, after a corresponding sequence has been read from the hard disk. However, whether in TS or PES recording mode, a PES header doesn't systematically directly precede the corresponding picture header. In other words, picture headers are not necessarily aligned on the beginning of a PES packet payload, and data irrelevant to the considered picture may exist between the PES header and the Picture header. For the PES parser to behave correctly, it is nevertheless necessary to supply this PES header. Else, the PES parser may not forward the picture data to the video decoder 9: all data preceding the first PES header is usually rejected after a decoder reset. Thus a Picture header followed by picture data not preceded by a PES header would also be rejected. According to the present embodiment, a dummy PES header is inserted before the Picture header of the picture to be decoded. A coherent PES stream is thus restored, with a minimum of irrelevant data being read from the hard disk and no irrelevant data being sent to the decoder 9.

A simple example involving fast forward at twelve times the normal speed will be used to describe the insertion of the dummy PES header. For the purpose of this example, it will be supposed that only I-type pictures are accessed. Precautions to be taken when this is not the case, i.e. when the picture to be displayed is of the P or B-type, will be described later.

Fast forward at ten times the normal speed involves reading and decoding one picture out of twelve (supposing only I-type pictures are accessed) and displaying the decoded pictures at the normal rate of one picture every 40 ms, in case of a 50 Hz frame rate.

(a) Stream Edition at the PES Layer Level

The first task of microprocessor 10 is to determine the first video access unit to be extracted from the hard disk drive. Supposing that the fast forward starts at a time T compared to the beginning of the video stream, the first picture to be displayed is the first picture present in the stream after T.

In order to be used as an index in the VDU Table and the Temporal Table, T is truncated to an integer number of seconds. Using the VDU Table, the corresponding VDU is requested from the EIDE interface and loaded into memory (i.e. the trickmode buffer area), if it is not already present.

The Temporal Table points to the Sequence descriptor in this VDU containing the Picture descriptor. The Sequence descriptor's contents are used to load the corresponding whole video sequence into memory 5. Decoder 9 is such that the microprocessor 10 can adjust the decoding parameters of the decoder 9. It may then not be necessary to transmit Sequence Headers to the PES Parser before transmitting the dummy PES Headers followed by the Picture data.

Each picture representing 40 ms and using the Picture List (which points to the different Picture descriptors of the pictures in the sequence), it is easy to access the Picture descriptor which in time is the closest to T. The Picture descriptor indicates the offset of the picture header in the video sequence loaded in memory. Thus the desired picture is sent to the decoder and the decoder is programmed by microprocessor 10 to correctly handle this picture.

In this case, data is provided from memory 5 to the PES Parser 6, since the transport layer has already been removed.

Figure 7A:
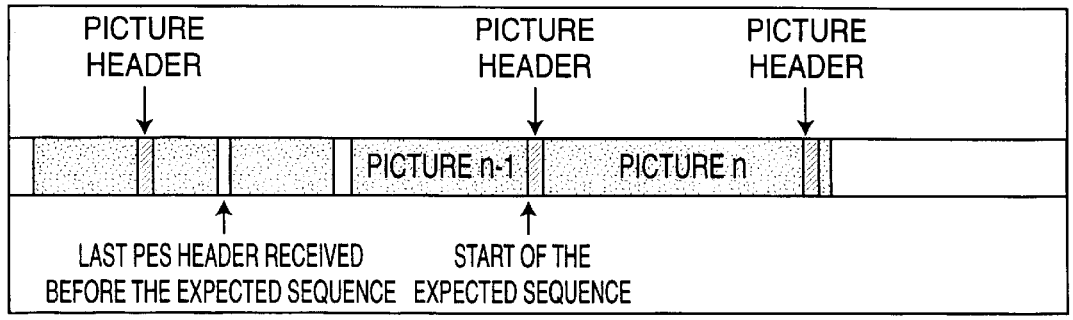
FIG. 7a is a representation of a PES layer video stream before insertion of a dummy PES header.
Figure 7B:
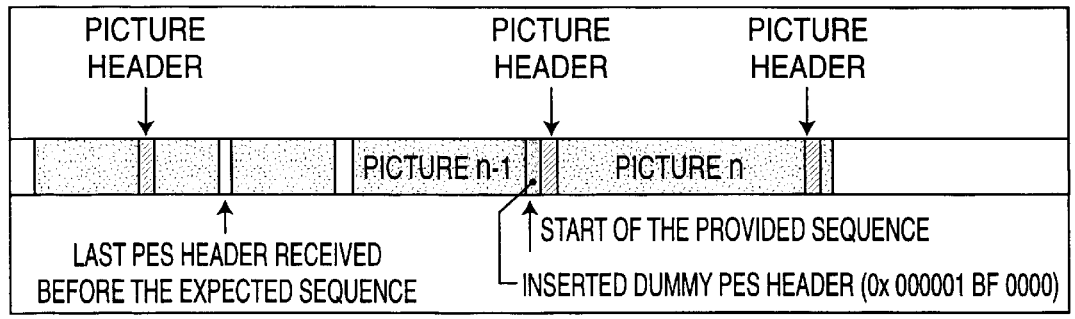
FIG. 7b is a representation of the PES layer video stream of FIG. 7a after insertion of a dummy PES header.

FIGS. 7a and 7b represent a PES stream under the form of sequential pictures mapped into PES packets containing a picture to be decoded. The represented part of the stream may be that stored in the video read FIFO, assuming that only the PES layer was recorded. Each picture data is preceded by a Picture header, both together forming a video access unit. The stream includes PES headers at positions generally independent of the content of the elementary video stream.

FIG. 7a shows the unedited PES stream, picture n being the picture to be displayed. It is preceded by a header. The header of the PES packet containing the Picture header of picture n is indicated by an arrow. FIG. 7b shows the edited PES stream, into which the microprocessor 10 has inserted the dummy PES header, just in front of the Picture header of picture n, so as to avoid any intervening data between the two headers.

According to the present embodiment, the dummy PES header has the format given in table 7. It is the shortest header allowed by the MPEG II Systems document (i.e. 9 bytes), and is sent to the video decoder 9 before the content of the video read FIFO is read starting from the address defined by the Picture header offset. The decoder will then see a valid PES stream and process the picture data as instructed by the microprocessor 10.

A dummy PES header is inserted each time there is a gap in the sequence of video access units to be sent to the decoder.

In the tables below, the notation '0x' designates hexadecimal values.

The lower case letter 'u' designates a variable binary value.

TABLE 7

Dummy PES Header

| Value | Signification |
|---|---|
| 0000 0000 0000 0000 0000 0001 ("0x000001") | Packet start code prefix |
| 1110 uuuu (where 'uuuu' varies between "0xE0 -> 0xEF") | Video Stream number (uuuu)$_b$ |
| 0000 0000 0000 0000 ("0x0000") | PES packet length |
| 10$_{(7:6)}$ | |
| uu$_{(5:4)}$ | PES_scrambling_control These two bits shall be a copy of the same bits from the previous PES packet header |
| 0$_{(3)}$ | PES_Priority low |
| 0$_{(2)}$ | Data_alignment_indicator: It is not defined whether a video start code immediately follows the PES Header or not |
| 0$_{(1)}$ | Copyright |
| 0$_{(0)}$ | Original_or_copy: PES packet payload is a copy |
| 00$_{(7:6)}$ | PTS_DTA_Flag: No PTS and DTS fields present |
| 0$_{(5)}$ | ESCR_Flag: No ESCR fields present |
| 0$_{(4)}$ | ES_rate_Flag: No ES_rate field is present |
| 0$_{(3)}$ | DSM_trick_mode_Flag: No DSM_trick_mode field is present |

TABLE 7-continued

Dummy PES Header

| Value | Signification |
|---|---|
| 0$_{(2)}$ | Additional_copy_info_Flag: Corresponding field is not present |
| 0$_{(1)}$ | PES_CRC_Flag: Corresponding field is not present |
| 0$_{(0)}$ | PES_extension_Flag: Corresponding field is not present |
| 0000 0000 ("0x00") | PES packet header length (no more bytes in the PES header) |

(b) Stream Edition at the TS Layer Level

In this case, data is transferred from the read FIFO 22 to the Transport Stream demultiplexer 7.

The TS layer has an additional constraint compared to the PES layer: editing can only be done at the TS packet level, i.e. a whole TS packet has to be added or removed. Inserting or deleting bytes in existing packets results in an invalid TS stream.

Consequently, determination of the SEU containing the picture to be decoded is carried out in a slightly different way compared to case (a). Again, a whole slice of stream containing the video sequence containing the picture is loaded in memory 5. In order to comply with the requirement to submit only entire TS packets to the demultiplexer 7, it is required to start reading starting from the TS header of the TS packet containing the Picture header of the picture to be decoded. The TrickModes information provides for the necessary address information: in case of TS stream recording, all addresses in TrickModes information descriptors are suitably aligned on the TS packet borders.

Figure 8A:
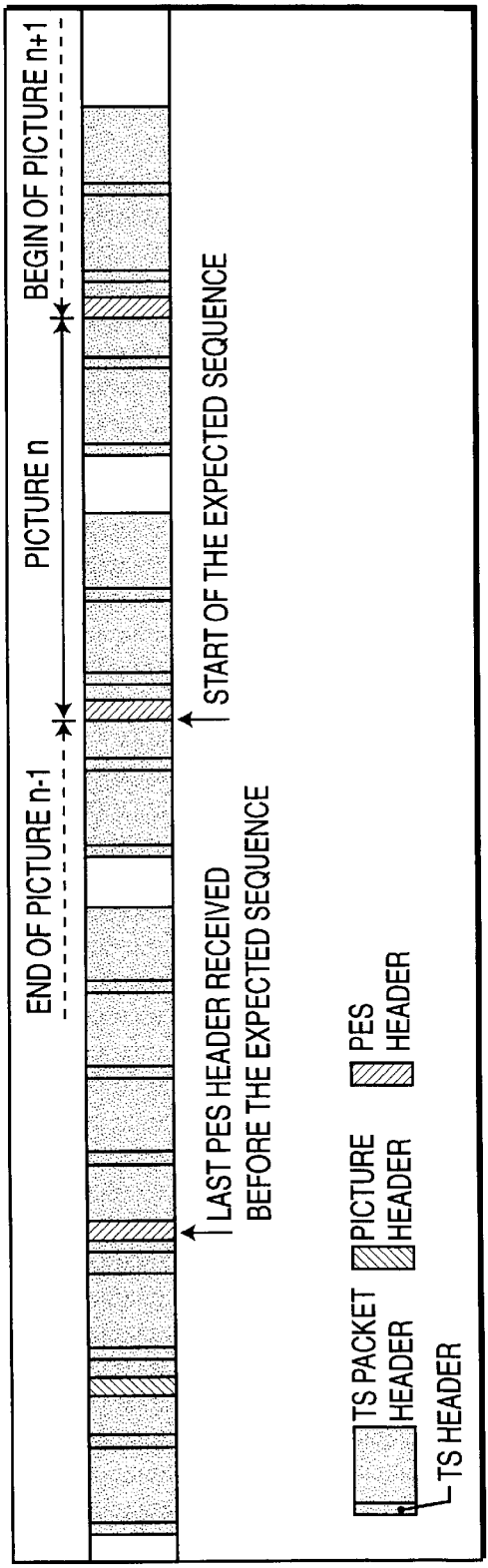
FIG. 8a is a representation of a TS layer video stream before insertion of a TS packet including a dummy PES header.

FIG. 8a represents a TS stream of packets of the same video component (i.e. having same PID) containing the Picture header of the picture to be decoded.

Figure 8B:
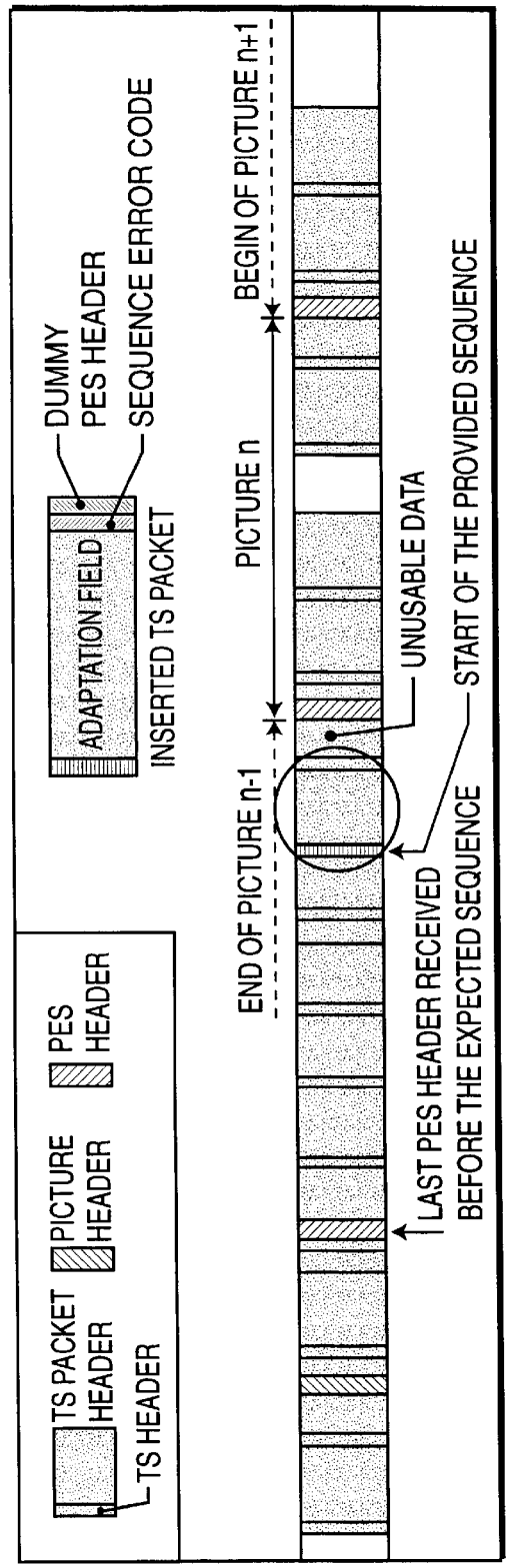
FIG. 8b is a representation of a TS layer video stream of FIG. 8a after insertion of a TS packet including a dummy PES header.

Instead of inserting only a PES header, a whole TS packet is inserted. This TS packet also contains a dummy PES header, for the same reasons as for (a). FIG. 8b illustrates the stream after the TS packet insertion.

The inserted TS packet header contains the same PID value as that of the TS packet header of the TS packet comprising the Picture header. The TS packet header also contains a continuity_count value which is equal to that of the TS packet header of the TS packet containing the Picture header, decremented by one and taken modulo 16, to be consistent with the following TS packet's value. The countinuity count value is directly read in the stream in memory. Among the adaptation field flags, the discontinuity error flag is set to indicate a discontinuity compared to any previous continuity_count value. The adaptation field's length is chosen so that the length of the entire TS packet, header included, is 188 bytes.

Figure 9:
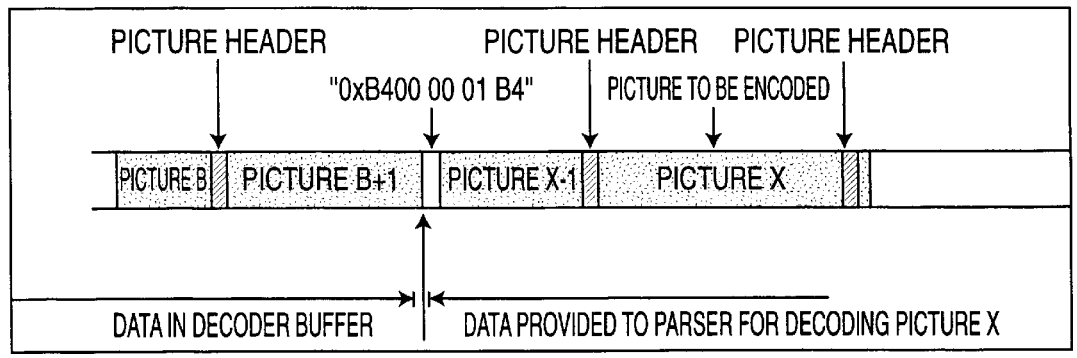
FIG. 9 is a representation of an elementary video stream seen by the input buffer of a video decoder.

The TS payload contains the dummy PES header, already described. Contrary to case (a), irrelevant or unusable data may be present between the PES header and the Picture header of the picture to be decoded, since the Picture header is not necessarily aligned with the end of the TS header. In order to inform the video decoder to ignore this irrelevant data, the inserted TS header also contains a sequence error code, after the dummy PES header. FIG. 9 illustrates the data received by the decoder, PES layer removed. Picture X is the picture to be decoded. The decoder's input buffer still contains partial data previously received, concerning a picture B+1, resulting from the transfer of a previous picture to be decoded, for instance picture B. Data relating to picture X−1 is the data present between the dummy TS packet inserted by microprocessor 10 and the Picture Header of picture X. The TS header of the dummy TS packet has been removed by the demultiplexer 7, and the dummy PES header contained in the dummy TS packet's payload has been removed by the PES Parser 6. Between the partial data of pictures B+1 and X−1, there remains the error sequence code ("0x00 00 01 B4") preceded by another code ("0xB4").

Upon detection of the sequence error code, mentioned among others in Section 6.2.1. and Table 6-1 of the MPEG II Video document, the decoder 9 rejects all data received before the error code, and all data received in the future, up to the next Picture Header. Decoder 9 is constructed so as to have this behaviour.

A new problem is introduced by the insertion of the sequence error code: once the PES parser 17 has rid the stream of the PES headers, it may happen that the last bytes of the payload of the PES packet preceding the inserted PES packet, combined with the first byte of the sequence error code (i.e. "0x00") constitute a Picture header start code (i.e. "0x00 00 01 00"). To avoid this case, a byte of value "0xB4" is inserted between the dummy PES header and the sequence error code. In this case, if the last three bytes of the preceding PES packet payload are indeed "0x00 00 01", then the formed code is another sequence error code "0x00 00 01 B4". Whether this code is present once or twice is not important as far as the behavior of the video decoder is concerned. When the last three bytes and the "0xB4" byte do not form the sequence error code, the presence of the B4 is of no consequence because the following sequence error code will in any event eliminate the previous contents of the video decoder's input buffer, including the additional "0xB4".

TABLE 8

TS packet with dummy PES Header and sequence error code

| Value | Signification |
|---|---|
| HEADER | |
| 0x47 | Sync Byte |
| 0 $_{(7)}$ | No error in the TS packet |
| 1 $_{(6)}$ | Start of a PES packet |
| 0 $_{(5)}$ | Transport priority low |
| (PID 5 MSB) $_{(4:0)}$ | 5 MSB of the video stream component PID |
| (PID 8 LSB) $_{(7:0)}$ | 8 LSB of the video stream component PID |
| 00 $_{(7:6)}$ | TS payload not scrambled |
| 11 $_{(5:4)}$ | Adaptation field followed by payload |
| (N−1) $_{(3:0)}$ | continuity_count: takes the value of the following TS packet continuity_count minus 1 (modulo 16) |
| 0xA9 (169 $_{Dec}$) | Adaptation field length: Equals to 183 minus the sum of: - dummy PES header length (9 bytes) - sequence error code length (5 bytes) |
| 1 $_{(7)}$ | Adaptation field flags: |
| 0000000 $_{(6:0)}$ | Discontinuity error is set. |
| 0xFF * 168 | 168 stuffing bytes |
| PAYLOAD | |
| 0x00 | dummy PES header |
| 0x00 | |
| 0x01 | |
| (1110 uuuu)b | |
| 0x00 | |
| 0x00 | |
| (10uu 0000)b | |
| 0x00 | |
| 0x00 | |
| 0xB4 | Ensures that the code given hereafter will not be included into an undesired sequence. |
| 00 00 01 B4 | sequence error code |

Normally, pictures accessed one by one during trickmode are not necessarily intra-type pictures. It may thus be necessary to decode other pictures and to maintain them in memory in order to decode a particular picture. If the picture to be displayed is of the P-type picture, then it will be necessary to decode the preceding I-type picture (which can be found using the Picture descriptors preceding the Picture descriptor of the picture to be displayed) and to decode that I-type picture first. It must be remembered that pictures are transmitted—and stored—according to the order in which they are to be decoded, not the order according to which they are to be displayed. This order generally differs from the displaying order. The video decoder will be instructed by the microprocessor 6 to only decode the I-type picture, but not to display it. The P-type picture is then decoded and displayed.

Similarly, if a B-type picture is to be decoded, the preceding and following I and/or P type pictures have to be extracted from the hard disk and decoded first.

The present embodiment concerns mostly TS stream packet recording and reproduction, but of course the recording/reproduction of other layers, in particular the PES layer, is not outside of the scope of the invention.

Moreover, although according to the present embodiment, the microprocessor 6 manages the file systems of the hard disk drive, this task may also be performed by another processor in the receiver, in particular the video decoder 10.

Also, although the mass storage device used in the present embodiment is a hard disk drive, another type of device could also be used. For example, recordable Compact Discs or Digital Video Discs may be employed.

What is claimed is:

1. Method for decoding a stored packetized data stream for reproduction in a trick play mode, said packetized data stream being stored in accordance with a predetermined format understandable by the decoder, said stored packetized data stream comprising objects each comprising packets, a packet comprising a header and a payload, an elementary stream being encapsulated as payload in the packets, said method comprising the steps of:

selecting objects, according to their headers, contiguous or not, in the elementary stream, in order to play trick modes.

extracting the packets of the selected objects from the stored packetized data stream, inserting a packetized data stream packet header before said object header, in order to obtain a reconstructed data stream in accordance with said predetermined format;

transferring said reconstructed stream to a packetized data stream parser.

2. Method according to claim 1, wherein the stored packetized data stream is a PES stream, the elementary stream an elementary video stream and the object header one of the following: a sequence header, a picture header, a group of picture header.

3. Method according to claim 2, wherein the inserted packet header is a dummy packet header.

4. Method for decoding a stored transport stream encapsulating a packetized data stream for reproduction in a trick play mode, said packetized data stream being stored in accordance with a predetermined format understandable by the decoder and comprising objects each comprising packets, a packet comprising a header and a payload, an elementary stream being encapsulated as payload in the packets, said method comprising the steps of:

selecting objects, according to their headers, contiguous or not, in the elementary stream, in order to play trick modes;

extracting the packets of the selected objects from the stored packetized data stream, inserting a transport stream packet before the transport stream packet containing the object header, said inserted transport stream packet comprising a packetized data stream header, in order to obtain a reconstructed data stream in accordance with said predetermined format;

transferring the inserted transport stream packet followed by the transport stream packet containing the object header to a transport stream demultiplexer followed by a packetized data stream parser.

5. Method according to claim 4, wherein the elementary stream is an elementary video stream, and wherein the object header is one of the following: a sequence header, a picture header, a group of picture header.

6. Method according to claim 5, wherein the packetized data stream header in the inserted transport stream packet is a dummy packet header.

7. Method according to claim 6, wherein the inserted transport stream packet further includes a sequence error code in its payload.

8. Method according to claim 7, wherein an additional code is inserted before the sequence error code, in order to avoid the appearance of a binary sequence start code.

9. Method according to claim 8, wherein said additional code is the code "0×B4".

10. Method according to claim 9, wherein the header of the inserted transport stream packet comprises a continuity counter value equal to that of the object header of the transport stream packet including the object header minus one, and a continuity counter discontinuity information.

11. Device for decoding a stored packetized data stream for reproduction in a trick play mode, said packetized data stream being stored in accordance with a predetermined format understandable by the decoder, said stored packetized data stream comprising objects each comprising packets, a packet comprising a header and a payload, an elementary stream being encapsulated as payload in the packets, said device comprising:

means for selecting objects, according to their headers, contiguous or not, in the elementary stream, in order to play trick modes, means for extracting the packets of the selected objects from the stored packetized data stream, means for inserting a packetized data stream packet header before said object header, in order to obtain a reconstructed data stream in accordance with said predetermined format, means for transferring said reconstructed stream to a packetized data stream parser.

12. Device for decoding a stored transport stream encapsulating a packetized data stream for reproduction in a trick play mode, said packetized data stream being stored in accordance with a predetermined format understandable by the decoder, said packetized data stream comprising objects each comprising packets, a packet comprising a header and a payload, an elementary stream being encapsulated as payload in the packets, said device comprising:

means for selecting objects, according to their headers, contiguous or not, in the elementary stream, in order to play trick modes, means for extracting the packets of the selected objects from the stored packetized data stream, means for inserting a transport stream packet before the transport stream packet containing the object header, said inserted transport stream packet comprising a packetized data stream header, in order to obtain a reconstructed data stream in accordance with said predetermined format, means for transferring the inserted transport stream packet followed by the transport stream packet containing the object header to a transport stream demultiplexer followed by a packetized data stream parser.

* * * * *